July 8, 1930.    R. A. GOODHUE    1,770,074
DUST COLLECTOR
Filed Dec. 18, 1928    2 Sheets-Sheet 1

ROY A GOODHUE Inventor

By Herbert E. Smith
Attorney

July 8, 1930. R. A. GOODHUE 1,770,074
DUST COLLECTOR
Filed Dec. 18, 1928 2 Sheets-Sheet 2

ROY A. GOODHUE  Inventor
By Herbert E. Smith
Attorney

Patented July 8, 1930

1,770,074

UNITED STATES PATENT OFFICE

ROY A. GOODHUE, OF SPOKANE, WASHINGTON

DUST COLLECTOR

Application filed December 18, 1928. Serial No. 326,887.

My present invention relates to an improved dust collector which, while adapted for separating dust or small particles from air currents in general, is particularly designed for use in the process of desiccating liquid substances as milk. In the process of desiccating milk by the removal of the moisture and delivering the solids therefrom, where air currents are employed in the separation process and the solids are dried to powder form, the air currents as they are freed to the atmosphere carry away with them the "fines" or the finest of the powdered solid. Usually the fines are so light that they escape from the drier, but they possess a value sufficient to justify their reclamation or recovery from the laden air currents, and the purpose of my invention is to recover these fines and restore them to the system in which the desiccating is proceeding, thus insuring a complete recovery of the solids from the moisture of the milk.

In carrying out my invention the dust laden air currents, as they come from the usual collector and drier, are passed through a filter or separator in which the coarsest dust is separated from the air currents, which are usually hot air currents; then the air currents are filtered, washed, or sprayed to remove the finest dust remaining; the air currents are freed; and the ultimate dust is liquefied and returned to the supply of milk that is to be desiccated. While I have referred to the process as that of treating milk, it will be understood that the dust collector may be used in connection with other processes involving the separation of dust from the laden air currents of any suitable nature.

In the accompanying drawings I have illustrated one complete example of the physical embodiment of my invention in which the parts are combined and arranged according to the best mode I have thus far devised for the practical application of the principles of my invention.

Figures 1, 5, 6, 7:
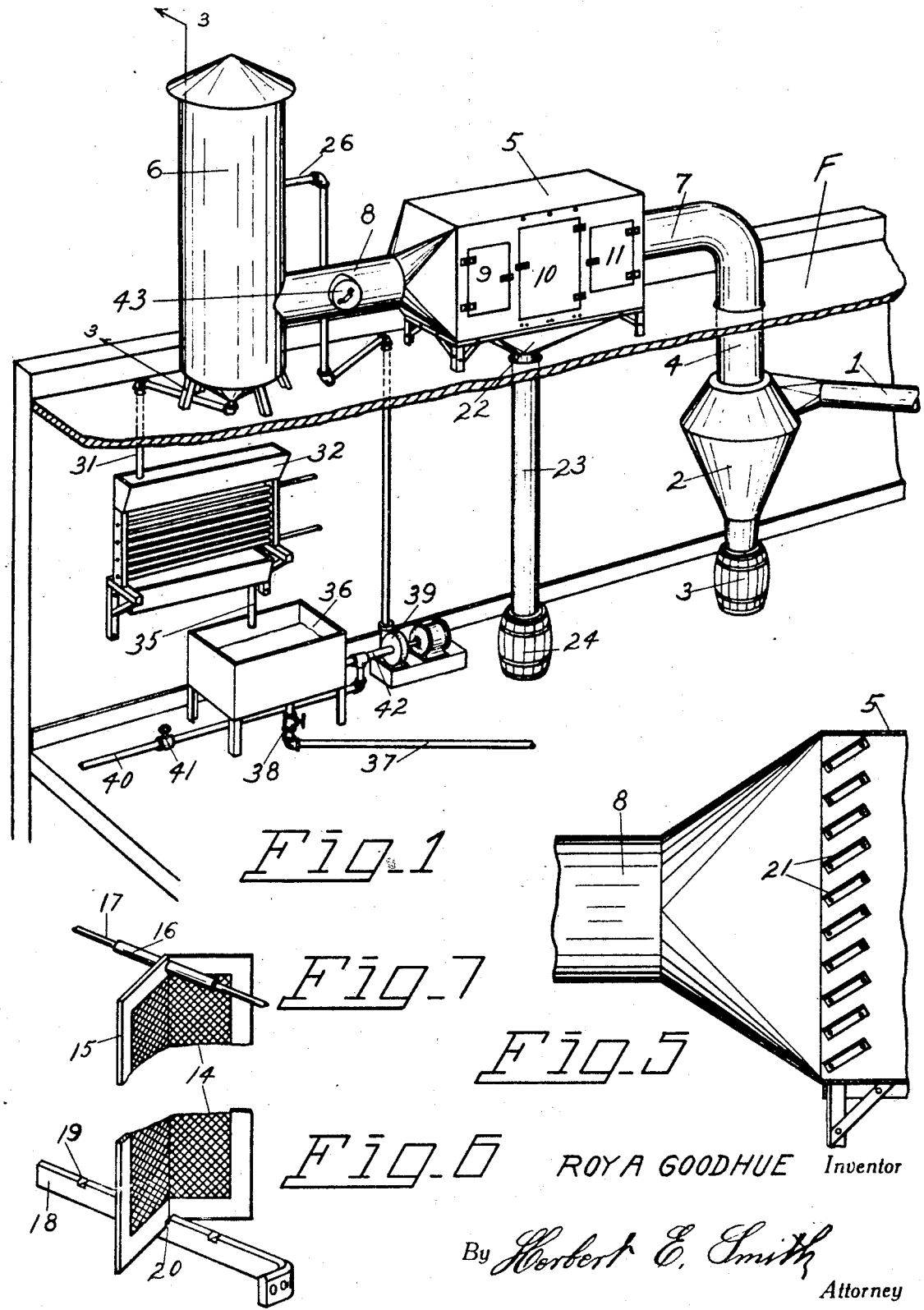
Figure 1 is a perspective view, with parts broken away from convenience of illustration, showing an embodiment of my invention.
Figure 5 is a vertical longitudinal sectional view at the discharge end of the filter or separator disclosing the baffle plates near the outlet from the filter casing.
Figure 6 is a detail perspective view showing the manner of supporting some of the filter plates in the filter-separator.
Figure 7 is a similar detail view at the upper end of such a plate.
Figure 2:
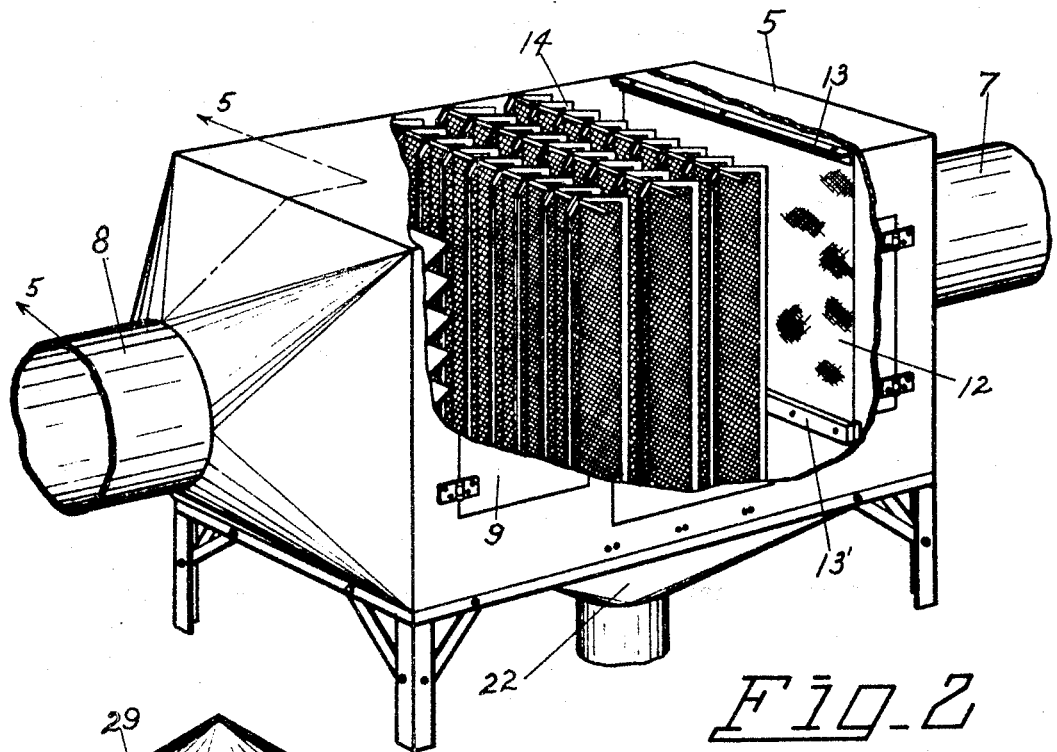
Figure 2 is a perspective view, partly broken away, of the air filter for separating the coarser dust.
Figure 3:
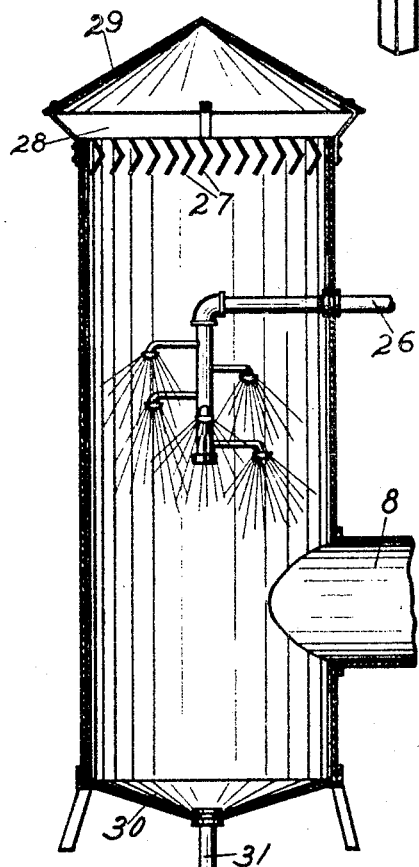
Figure 3 is a vertical sectional view of the liquefier for recovering the finest of the dust from the dust-laden air currents before they are freed to the atmosphere.
Figure 4:
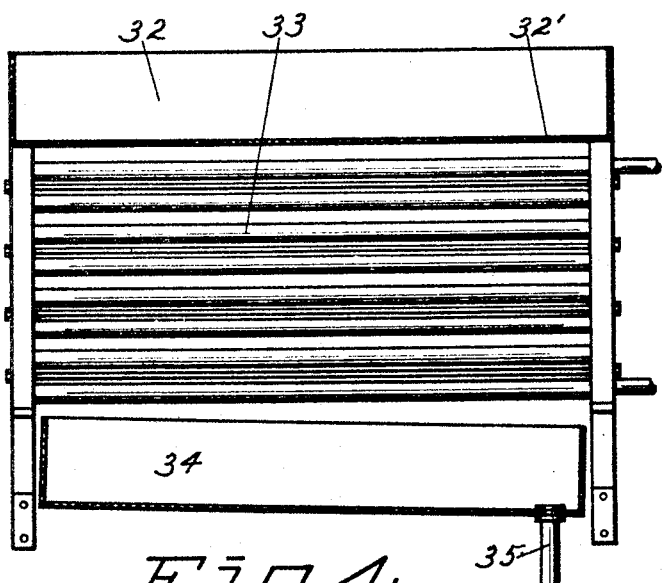
Figure 4 is a view in elevation, with parts in section, of the cooler for the liquefied dust.

In order that the general assembly, relation of parts, and utility of my invention may readily be understood I have shown in Figure 1 a pipe 1 with dust laden air currents therein which conveys the solids to the drier or cyclonic collector 2, in which collector the major portion of the solids are separated from the air currents and deposited in the barrel or other receptacle 3. In usual practice, the air currents pass out through the discharge pipe 4 and the fine dust, too fine to settle in the collector, passes out as waste to the atmosphere.

By the utilization of the device and apparatus of my invention the dust laden air currents pass from the discharge pipe 4 through an intake pipe 7 to the interior of the filter-separator casing 5 and from there the air currents pass through the outlet pipe 8 to the liquefier 6. The casing 5 is supported on the floor F above the collector 2, and access may be had to the interior of the casing by means of doors as 9, 10 and 11 in one side thereof.

Within the entrance to the casing 5 a screen 12 is provided which is preferably fashioned of cheese cloth or fabric of large mesh to perform the functions of a baffle for the dust carried by the air currents. The baffle is hinged at its upper edge 13 and the lower edge 13' of the baffle is free so that the baffle may sway to and fro under impulse of the air currents for the purpose of dropping to the floor of the casing any dust or powder that may be stopped by the baffle.

After passing the baffle the dust laden air currents encounter a plurality of sets of angular, foraminous screens 14, arranged in transverse rows, three rows here being shown, and each row is made up of a suitable number of the angular screens. The screens are of V-shape formation in horizontal cross section and they stand in vertical planes in the casing 5 so that their angular portions are staggered, thus insuring a tortuous passage of the dust laden air currents through the succeeding sets of screens for a most effective filtration of the dust from the air currents, the dust of course falling to the bottom of the casing as it encounters the filtering screens.

The screens 14 are bound with frames 15 and each screen at its upper end is fashioned with a supporting sleeve 16 that is slipped onto a rod 17 extending transversely of the casing and supported by the walls of the casing at its opposite ends. At their lower ends the sets of screens are supported on a transversely extending, vertically arranged, flat bar 19 having flanged ends fixed to the opposite side walls of the casing. On their upper edges these flat bars are fashioned with spaced notches 19, and on their lower edges the angular frames 15 are provided with complementary notches 20, said pair of notches cooperating to retain the screen, but loosely, so that the screen may vibrate or shake, and thus release any dust that might tend to settle thereon. The sleeves 16 are also loosely engaged on the rods 17 to permit shaking or vibrating the screens, but the screens of each set are retained against operative displacement, and may be adjusted relatively one to another.

A set of angularly disposed, transversely arranged, baffle plates 21 is also arranged adjacent the outlet end of the casing 5, the set being arranged in a vertical plane and the plates of the set being inclined so that the dust laden air currents will strike the under sides of the plates to free the air currents of finer dust that passes through the filtering screens.

The casing is provided with a tapering bottom 22 for the dust separated from the air currents, and the dust falls by gravity to a discharge pipe 23, whence it passes into a barrel or other receptacle 24, and is thus recovered. The casing itself, or the screens, may be shaken to release the accumulated dust therefrom in suitable manner.

After leaving the filter casing, by way of the outlet pipe 8, the air currents pass through this pipe to the casing 6, said pipe 8 entering the casing near its bottom or lower end in order that the air currents may ascend through a shower or spray of water from a spray device 25 having a number of spray nozzles 25' through which the water is discharged in a shower that fills the cross area of the casing. The air currents thus pass upwardly through the casing, but the dust carried by the currents is gathered by the falling shower and dissolved by the shower of water.

Water or liquid is supplied to the spray device through pipe 26 that enters the cylindrical casing near its upper end, and the spray device is located in an elevated position in order to secure a material fall for the shower as it gathers the dust, in the liquefier.

After ascending through the atomized or sprayed water, the air currents, which have substantially been freed of the dust, strike a set of baffle plates 27 in the form of a louvre. The plates are V-shape in cross section, extend transversely of the casing, and the louvre occupies the cross area of the casing so that as the air currents pass through the louvre, any dust remaining in the currents may be caught by the louvre. The air is vented through an annular opening 28, beneath the conical cap or cover 29 of the casing.

Any moistened dust falling from the baffle plates 27, will pass down through the casing with the atomized or sprayed liquid, and the latter falls to the tapered bottom 30 of the casing with other moistened or dissolved dust below the spray device.

From the bottom of the casing the dissolved dust falls by gravity through an outlet pipe 31 to an upper trough 32 that is fashioned with a perforated or foraminous bottom 32'. The liquid trickles through this perforated bottom to a coil 33 of cooling pipes, and over this coil the liquid passes to a lower trough 34, which has an outlet pipe 35 for the liquid or fluid.

A collecting tank 36 is located below the outlet pipe 35, and a return pipe 37, having a control valve 38, is connected with this tank, in order that the liquid may be conveyed back to the desiccating system, mixed with the milk if desired, and returned to drier 2 through pipe 1.

A pump 39 is employed to circulate the liquid for the atomizer or spray device in the casing 6. Water is supplied to the pump through an intake pipe 40 having a control valve 41, and this pipe, as seen in Figure 1, is connected to a pipe 42 that joins the tank with the casing of the pump. Should the liquid collecting in the tank 36 be too thin or too fluent for return to the drier, the valves 37 and 41 may be closed, and the pump then used to return the liquid from the tank 36 to the casing 6, and this circulation is maintained until the thickness or consistency of the liquid attains such desired degree as required by the drier.

A hand hole in the pipe 8 is closed by a cap 43, and if necessary, access may be had to the interior of the pipe when the cap is removed.

By means of the treatment to which the air currents are subjected by the appliance of my invention, the hot air currents emerging from the liquefier have been relieved of substantially all of the dust that escapes from the drier in ordinary practice, and a material saving in the recovery of this dust is attained or accomplished by the operation of the collecting system of my invention.

Having thus fully described my invention, what I claim as new and desire to secure by Letters Patent is:—

1. In a separator for dust laden air, the combination with a filter casing having an air inlet and outlet and an outlet for dust, of a foraminous baffle within the casing, a plurality of transversely arranged rows of foramious filters and supports for said filters, the individual filters of the rows being V-shaped in cross section and arranged in staggered formation.

2. In a separator for dust laden air, the combination of a casing having an air inlet and a swinging, foraminous baffle within the inlet, an air outlet and a row of vertically spaced, horizontal, inclined baffle plates adjacent the outlet, and a dust outlet pipe, a plurality of staggered rows of foraminous screen-filters extending transversely of the casing, and supports for said rows of filters.

3. In a system for separating dust from air, the combination with a filter having air inlet and outlet and a dust outlet, of a moistener connected with the filter for moistening the finer dust from the filter, said moistener comprising a casing, a liquid atomizing device above the inlet for dust laden air and a supply pipe therefor, an outlet from the moistener and a collecting tank for the liquid, and a pump for returning liquid from the tank to the supply pipe.

4. In a separator for dust laden air, the combination with a moistener casing having an atomizer above its air inlet, a liquid supply pipe to the atomizer, an outlet pipe at the bottom of the casing, and a collecting tank below the outlet pipe, of a pump having an inlet pipe, a discharge pipe from the pump to the supply pipe, an outlet pipe from the tank to the inlet pipe of the pump, an outlet pipe from the tank, and valves for controlling liquid in said pump inlet-pipe and the tank outlet-pipe.

In testimony whereof I affix my signature.

ROY A. GOODHUE.